United States Patent
Kato et al.

(10) Patent No.: US 12,386,171 B2
(45) Date of Patent: Aug. 12, 2025

(54) LIGHT SHIELDING MEMBER

(71) Applicant: NITTA CORPORATION, Osaka (JP)

(72) Inventors: Takumi Kato, Nara (JP); Takashi Megumi, Nara (JP)

(73) Assignee: NITTA CORPORATION, Osaka (JP)

( * ) Notice: Subject to any disclaimer, the term of this patent is extended or adjusted under 35 U.S.C. 154(b) by 0 days.

(21) Appl. No.: 18/552,926

(22) PCT Filed: Mar. 2, 2022

(86) PCT No.: PCT/JP2022/008883
§ 371 (c)(1),
(2) Date: Sep. 28, 2023

(87) PCT Pub. No.: WO2022/209550
PCT Pub. Date: Oct. 6, 2022

(65) Prior Publication Data
US 2024/0184095 A1    Jun. 6, 2024

(30) Foreign Application Priority Data
Mar. 29, 2021 (JP) .................. 2021054883

(51) Int. Cl.
G02B 5/30 (2006.01)
G02B 26/02 (2006.01)

(52) U.S. Cl.
CPC .................. G02B 26/02 (2013.01)

(58) Field of Classification Search
CPC ...................................... G02B 5/30
See application file for complete search history.

(56) References Cited

U.S. PATENT DOCUMENTS

| 2009/0015902 A1 | 1/2009 | Powers |
| 2009/0167971 A1* | 7/2009 | Powers ............. G02B 13/06 349/18 |

(Continued)

FOREIGN PATENT DOCUMENTS

| JP | S5810717 A | 1/1983 |
| JP | 2007231265 A | 9/2007 |

(Continued)

OTHER PUBLICATIONS

International Search Report issued for the corresponding international patent application No. PCT/JP2022/008883, dated May 24, 2022, 2 pages (for informational purposes only).

(Continued)

*Primary Examiner* — Joseph P Martinez
(74) *Attorney, Agent, or Firm* — Viering, Jentschura & Partner mbB

(57) ABSTRACT

A light shielding member of the present invention may include a first polarizing plate, a second polarizing plate facing the first polarizing plate, and a thermosensitive sheet interposed between the first polarizing plate and the second polarizing plate, in which the first polarizing plate and the second polarizing plate may be positioned so that their respective transmission axes are different from each other. The thermosensitive sheet may include a side chain crystal polymer that crystallizes at a temperature lower than the melting point and exhibits fluidity at a temperature of the melting point or higher where the side chain crystal polymer is oriented in one direction.

6 Claims, 1 Drawing Sheet

(56) References Cited

U.S. PATENT DOCUMENTS

2013/0122288 A1  5/2013 Miki et al.
2013/0308069 A1  11/2013 Junge et al.
2022/0404646 A1* 12/2022 Marutani ............. G02B 27/281

FOREIGN PATENT DOCUMENTS

| JP | 2010533252 A | 10/2010 |
| JP | 2011522277 A | 7/2011 |
| JP | 2013173912 A | 9/2013 |
| JP | 2014510934 A | 5/2014 |
| JP | 2018178060 A | 11/2018 |
| WO | 2021070673 A1 | 4/2021 |

OTHER PUBLICATIONS

Larios, L. et al., "Thermotropic Behavior of Side-Chain Liquid-Crystalline Polymers with a Pendant Terphenylene Mesogen", Molecular Crystals and Loquid Crystals, 2008, vol. 489, Issue 1, pp. 290-297.
European Search Report issued for the corresponding EP patent application No. EP 22 77 9775, dated Feb. 8, 2025, 8 pages (For informational purposes only).

* cited by examiner

LIGHT SHIELDING MEMBER

CROSS-REFERENCE TO RELATED APPLICATIONS

The present application is a national stage entry according to 35 U.S.C. § 371 of PCT application No.: PCT/JP2022/008883 filed on Mar. 2, 2022; which claims priority to Japanese Patent Application Serial No. 2021-054883 filed on Mar. 29, 2021; all of which are incorporated herein by reference in their entirety and for all purposes.

TECHNICAL FIELD

The present disclosure relates to a light shielding member.

BACKGROUND ART

A light shielding member that electrically controls the transmission and non-transmission of light is known (see, for example, Patent Document 1).

PRIOR ART DOCUMENT

Patent Document

Patent Document 1: Japanese Unexamined Patent Publication No. S58-10717

SUMMARY

A light shielding member is provided in which the transmission and non-transmission of light can be controlled by temperature, and a high transmittance is obtained.

The light shielding member includes a first polarizing plate, a second polarizing plate facing the first polarizing plate, and a thermosensitive sheet interposed between the first polarizing plate and the second polarizing plate, wherein the first polarizing plate and the second polarizing plate are positioned so that their respective transmission axes are different from each other, the thermosensitive sheet contains a side chain crystal polymer which is crystallized at a temperature lower than the melting point, while exhibiting fluidity at a temperature of the melting point or higher, and the side chain crystal polymer is oriented in one direction.

The light shielding member has the effects that the transmission and non-transmission of light can be controlled by temperature and a high transmittance is obtained.

DETAILED DESCRIPTION

Hereinafter, the light shielding member according to one embodiment is described in detail with reference to FIGS. 1 and 2.

Figure 1:
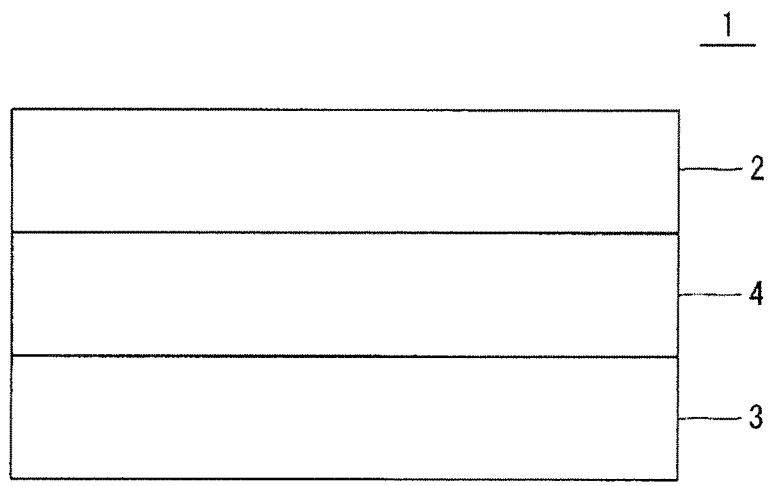
FIG. 1 is a side view illustrating a light shielding member according to one embodiment.
Figure 2:
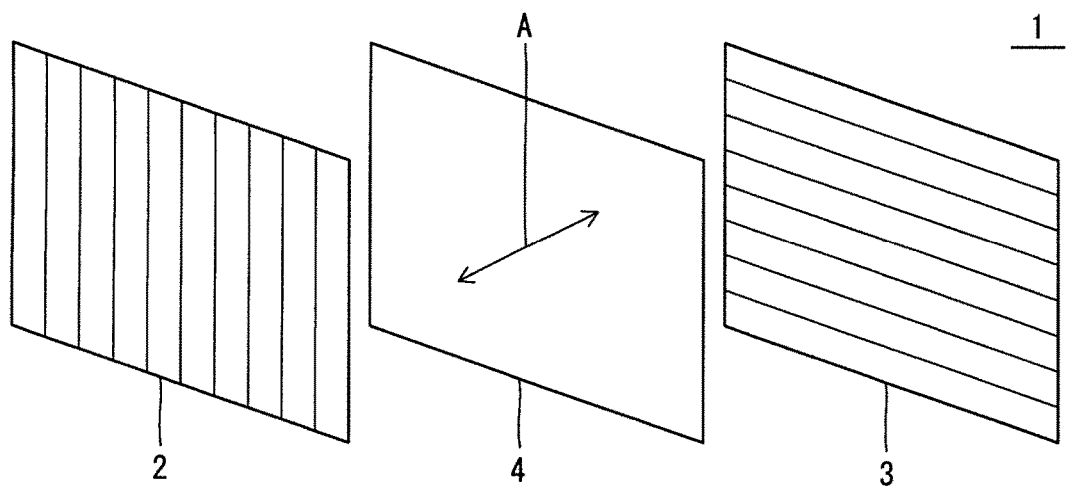
FIG. 2 is a disassembled perspective view of the light shielding member illustrated in FIG. 1.

As illustrated in FIGS. 1 and 2, a light shielding member 1 of the present embodiment includes a first polarizing plate 2, a second polarizing plate 3 facing the first polarizing plate 2, and a thermosensitive sheet 4 interposed between the first polarizing plate 2 and the second polarizing plate 3. The light shielding member 1 of the present embodiment is a laminated body in which the first polarizing plate 2 is laminated on one side of the thermosensitive sheet 4 and the second polarizing plate 3 is laminated on the other side of the thermosensitive sheet 4.

The first polarizing plate 2 and the second polarizing plate 3 are positioned so that their respective transmission axes are different from each other. The thermosensitive sheet 4 contains a side chain crystal polymer which is crystallized at a temperature lower than the melting point while exhibiting fluidity at a temperature of the melting point or higher. Additionally, the side chain crystal polymer (side chain crystal component) is oriented in one direction.

According to the composition described above, it is possible to obtain the effects that the transmission and non-transmission of light can be controlled by temperature and a high transmittance is obtained. To be more specific, the side chain crystal polymer described above is a polymer having a melting point. The melting point is a temperature at which, due to some equilibrium process, certain parts of the polymer which is initially aligned into an ordered arrangement become a disordered state, and is a value measured by using a differential scanning calorimeter (DSC) under a measurement condition of 10° C./min. The side chain crystal polymer is crystallized at a temperature lower than the melting point described above and exhibits fluidity through a phase transition at a temperature of the melting point or higher. In other words, the side chain crystal polymer has thermosensitivity that reversibly generates a crystal state and a fluid state (amorphous state) in response to temperature changes. Due to containing such a side chain crystal polymer, the thermosensitive sheet 4 has thermosensitivity derived from the side chain crystal polymer.

As described above, the first polarizing plate 2 and the second polarizing plate 3 are positioned so that their respective transmission axes are different from each other. Therefore, under the condition in the absence of the thermosensitive sheet 4, if light travels through the first polarizing plate 2 and the second polarizing plate 3 in this order, the light transmitted through the first polarizing plate 2 is not transmitted through the second polarizing plate 3. This point also applies to the case where the light travels in the order of the second polarizing plate 3 and the first polarizing plate 2.

When the side chain crystal polymer is in a crystal state, light is scattered in the thermosensitive sheet 4. Therefore, when the temperature of the light shielding member 1 is set to a temperature lower than the melting point, the light transmitted through the first polarizing plate 2 is scattered when it is transmitted through the thermosensitive sheet 4, and as a result, the light is transmitted through the second polarizing plate 3. At this time, since the side chain crystal polymer is oriented in one direction, the transmittance can be improved by aligning the refractive direction of light, and hence the light shielding member 1 has a high transmittance. In addition, when the side chain crystal polymer is in a fluid state, the light is not scattered in the thermosensitive sheet 4. Thus, when the temperature of the light shielding member 1 is set to a temperature of the melting point or higher, the light transmitted through the first polarizing plate 2 is not scattered when it is transmitted through the thermosensitive sheet 4 and accordingly is not transmitted through the second polarizing plate 3.

In this way, the light shielding member 1 can control the light shielding function (light and dark change) depending on the temperature, since the light shielding member 1 utilizes the change in optical characteristics of the side chain crystal polymer in addition to the thermosensitivity of the side chain crystal polymer. That is, the light shielding member 1 transmits light at a temperature lower than the melting point and does not transmit light at a temperature of the melting point or higher, when light travels from one of the first polarizing plate 2 and the second polarizing plate 3 toward the other. For example, the light shielding member 1 is transparent at a temperature lower than the melting point, and black at a temperature of the melting point or higher. In addition, the light shielding member 1 can repeatedly transmit and non-transmit light due to the fact that the side chain crystal polymer reversibly generates a crystal state and a fluid state in response to temperature changes.

The thickness of the first polarizing plate 2 is, for example, 200-1000 μm. The thickness of the second polarizing plate 3 is, for example, 200-1000 μm. The respective thicknesses of the first polarizing plate 2 and the second polarizing plate 3 may be the same or may be different. A commercially available product can be used for the first polarizing plate 2 and the second polarizing plate 3.

The respective transmission axes of the first polarizing plate 2 and the second polarizing plate 3 may be different from each other at an angle where the light transmitted through one does not transmit through the other, when the light travels from one of the first polarizing plate 2 and the second polarizing plate 3 toward the other in the absence of the thermosensitive sheet 4. Such an angle is, for example, 80 to 100°. FIG. 2 shows the state in which the respective transmission axes of the first polarizing plate 2 and the second polarizing plate 3 are 90° different from each other. That is, the first polarizing plate 2 and the second polarizing plate 3 illustrated in FIG. 2 are positioned so that their respective transmission axes are different from each other by 90°.

The term "the side chain crystal polymer is oriented in one direction" is not limited to the fact that all of the side chain crystal polymers included in the thermosensitive sheet 4 are oriented strictly in one direction. It is sufficient if the side chain crystal polymer is oriented substantially in one direction in the thermosensitive sheet 4. Confirmation that the side chain crystal polymer is oriented in one direction may be performed, for example, by using an X-ray scattering device.

The thermosensitive sheet 4 may be positioned so that an orientation direction A of the side chain crystal polymer is different with respect to the respective transmission axes of the first polarizing plate 2 and the second polarizing plate 3. In this case, it is easy to improve transmittance. The orientation direction A of the side chain crystal polymer may be different with respect to the respective transmission axes of the first polarizing plate 2 and the second polarizing plate 3, for example, by 10 to 80°. FIG. 2 shows a state in which the thermosensitive sheet 4 is positioned so that the orientation direction A of the side chain crystal polymer differs by 450 with respect to the respective transmission axes of the first polarizing plate 2 and the second polarizing plate 3.

As shown in FIG. 2, when the first polarizing plate 2 and the second polarizing plate 3 are positioned so that their respective transmission axes are different from each other by 90° and the thermosensitive sheet 4 is positioned so that the orientation direction A of the side chain crystal polymer is different with respect to the respective transmission axes of the first polarizing plate 2 and the second polarizing plate 3 by 45°, the transmittance at a wavelength of 500 nm at a temperature lower than the melting point is 5% or more, such as 15% or more. The upper limit of transmittance at the wavelength of 500 nm is not particularly limited, but for example, it may be 50% or less. The transmittance at the wavelength of 500 nm is a value obtained by measurement with a spectrophotometer.

The melting point of the side chain crystal polymer may be higher than 23° C., such as higher than 23° C. and 70° C. or lower, or 35 to 70° C. If the melting point is higher than 23° C., the light shielding member 1 transmits light at normal temperature (room temperature).

Therefore, the transmittance at room temperature (transmissive state) can be improved. The melting point can be adjusted, for example, by changing the composition of a monomer component that constitutes the side chain crystal polymer.

The side chain crystal polymer includes (meth)acrylate having a straight-chain alkyl group with 16 or more carbon atoms as a monomer component. For the (meth)acrylate having a straight-chain alkyl group with 16 or more carbon atoms, the straight-chain alkyl group with 16 or more carbon atoms functions as a side chain crystal part in the side chain crystal polymer. Specifically, the side chain crystal polymer is a comb-shaped polymer having a straight-chain alkyl group with 16 or more carbon atoms in the side-chain, and this side-chain is crystallized when it is aligned into an ordered arrangement by intermolecular forces or the like. The (meth)acrylate described above refers to acrylate or methacrylate.

Examples of the (meth)acrylate having a straight-chain alkyl group with 16 or more carbon atoms include (meth)acrylate having a linear alkyl group with 16-22 carbon atoms, such as cetyl (meth)acrylate, stearyl (meth)acrylate, eicosyl (meth)acrylate, behenyl (meth)acrylate, or the like. Only one type of the exemplified (meth)acrylate may be used, or two or more of them may be used in combination. The (meth)acrylate having a straight-chain alkyl group with 16 or more carbon atoms may be included at a ratio of 10-99% by weight, such as at a ratio of 15-99% by weight in the monomer component which constitutes the side chain crystal polymer.

The monomer component which constitutes the side chain crystal polymer may include other monomer which can be copolymerized with (meth)acrylate having a straight-chain alkyl group with 16 or more carbon atoms. Other monomer may include, for example, (meth) acrylate having an alkyl group with 1-6 carbon atoms, polar monomer, or the like.

Examples of (meth) acrylate having an alkyl group with 1-6 carbon atoms include methyl (meth) acrylate, ethyl (meth) acrylate, butyl (meth) acrylate, hexyl (meth) acrylate, or the like. Only one type of the exemplified (meth)acrylate may be used, or two or more may be used in combination. The (meth)acrylate having an alkyl group with 1-6 carbon atoms may be included at a ratio of 80% by weight or less, such as at a ratio of 0-80% by weight in the monomer component which constitutes the side chain crystal polymer.

The polar monomer includes, for example, an ethylenically unsaturated monomer having a carboxyl group, such as acrylic acid, methacrylic acid, crotonic acid, itaconic acid, maleic acid, and fumaric acid; an ethylenically unsaturated monomer having a hydroxyl group, such as 2-hydroxyethyl (meth)acrylate, 2-hydroxypropyl (meth)acrylate, and 2-hydroxyhexyl (meth)acrylate. Only one type of the exemplified polar monomer may be used, or two or more may be used in combination. The polar monomer may be included at a ratio of 10% by weight or less, such as at a ratio of 1-10% by weight in the monomer component which constitutes the side chain crystal polymer.

The non-limiting composition of the side chain crystal polymer is 15-90% by weight of (meth)acrylate having a straight-chain alkyl group with 16 or more carbon atoms, 5-75% by weight of (meth)acrylate having an alkyl group with 1-6 carbon atoms, and 5-10% by weight of a polar monomer. When (meth)acrylate having a straight-chain alkyl group with 16 or more carbon atoms is contained more by weight in the side chain crystal polymer than (meth) acrylate having an alkyl group with 1-6 carbon atoms, the crystallinity becomes higher, and the transmittance at a temperature lower than the melting point can be easily improved.

The polymerization method of the monomer component includes, for example, solution polymerization method, bulk polymerization method, suspension polymerization method, and emulsion polymerization method. If the solution polymerization method is used, the monomer component and solvent are mixed, polymerization initiator, chain transfer agent, or the like is added as necessary, and reaction is performed at 40-90° C. for approximately 2-10 hours while stirring.

The weight average molecular weight of the side chain crystal polymer may be 100000 or more, such as from 200000 to 900000, or from 250000 to 700000. The weight average molecular weight is measured by gel permeation chromatography (GPC) and is a polystyrene converted value of the resulting measured value.

The thermosensitive sheet 4 may contain the side chain crystal polymer in a ratio that causes it to exhibit thermosensitivity derived from the side chain crystal polymer. For example, the thermosensitive sheet 4 may contain the side chain crystal polymer as its main component. The main component means the component which is contained in the most amount by weight in the thermosensitive sheet 4. The content of the side chain crystal polymer may be 80% by weight or more. The upper limit value of the content of side chain crystal polymer may be 100% by weight or less.

In addition to the side chain crystal polymer, the thermosensitive sheet 4 may also contain an additive or the like. The additive includes, for example, a crosslinking agent. The crosslinking agent includes, for example, a metal chelate compound, aziridine compound, isocyanate compound, and epoxy compound. The content of the crosslinking agent may be 0.1-10 parts by weight to 100 parts by weight of the side chain crystal polymer. The crosslinking conditions are a heating temperature of approximately 90-120° C. and a heating time of approximately 1-20 minutes.

The thickness of the thermosensitive sheet 4 may range from 1 to 300 μm, such as from 20 to 150 μm. This makes it difficult for the scattering power of the thermosensitive sheet 4 to decrease and the transmittance to decrease. When the thickness of the thermosensitive sheet 4 is 20-150 μm, it is easy to improve the transmittance. The concept of the thermosensitive sheet 4 is not limited to a sheet form, but also includes a film form or a plate form, as long as the effect of the present embodiment is not damaged.

The thermosensitive sheet 4 may be a uniaxially stretched sheet. A uniaxially stretched sheet means a sheet that has been stretched in a uniaxial direction. When the thermosensitive sheet 4 is a uniaxially stretched sheet, it is possible to orient the side chain crystal polymer contained in the sheet in one direction. The uniaxial stretching process may be performed at a temperature of the melting point or higher of the thermosensitive sheet 4. The stretching magnification may be, for example, 1.03-5 times.

The thermosensitive sheet 4 is not limited to uniaxially stretched sheets as long as the side chain crystal polymer is oriented in one direction. For example, the thermosensitive sheet 4 may be an oriented film or the like, or it may be the one subjected to a rubbing treatment.

The thermosensitive sheet 4 may be in direct contact with the first polarizing plate 2 and the second polarizing plate 3. In this case, the light transmitted through the first polarizing plate 2 or the second polarizing plate 3 is incident on the thermosensitive sheet 4 without loss, and therefore, the light shielding member 1 exhibits an excellent light shielding function.

Since the thermosensitive sheet 4 can fix the first polarizing plate 2 and the second polarizing plate 3 without any adhesive layer, it is possible to directly contact the first polarizing plate 2 and the second polarizing plate 3. Specifically, when the temperature of the thermosensitive sheet 4 is set to be a temperature of the melting point or higher, the side chain crystal polymer shows fluidity, and therefore, the thermosensitive sheet 4 can be sticked to the first polarizing plate 2 and the second polarizing plate 3. When the side chain crystal polymer exhibits fluidity, the thermosensitive sheet 4 follows a fine concave-convex shape that exists on the surface of the first polarizing plate 2 and the second polarizing plate 3. When the thermosensitive sheet 4 in this state is cooled to a temperature lower than the melting point, the so-called anchoring effect is generated by crystallization of the side chain crystal polymer, and as a result, the first polarizing plate 2 and the second polarizing plate 3 can be fixed with the thermosensitive sheet 4. If necessary, other members may be interposed between the thermosensitive sheet 4 and the first polarizing plate 2. Likewise, other members may be interposed between the thermosensitive sheet 4 and the second polarizing plate 3.

The form of the light shielding member 1 is not particularly limited. The light shielding member 1 may be in the form of, for example, a film, sheet, plate or the like.

The light shielding member 1 can be suitably used in places where light shielding functions are required, and temperature changes are likely to occur. The light shielding member 1 may be, for example, for a window glass, partition, automotive glass, or the like. The uses of the light shielding member 1 are not limited to the exemplified ones.

Hereafter, the light shielding member is described in detail with Synthetic Examples and Examples, but the light shielding member is not limited only to the following Synthetic Examples and Examples.

Synthetic Examples 1 to 2: Side Chain Crystal Polymer

First, the monomers shown in Table 1 were added to a reaction vessel in the proportions shown in Table 1.

The monomers shown in Table 1 are as follows.
C22A: behenyl acrylate
C1A: methyl acrylate
AA: acrylic acid Next, "PERBUTYL ND" manufactured by NOF corporation was added to the reaction vessel as a polymerization initiator at a ratio of 0.5 parts by weight to 100 parts by weight of the monomer mixture, and a mixed solvent of ethyl acetate:heptane=70:30 (weight ratio) was added to the reaction vessel so as to obtain a solid concentration of 30% by weight, and a mixed solution was obtained. The resulting mixed solution was stirred at 55° C. for 4 hours, and further stirred at 80° C. for 2 hours to copolymerize each monomer and obtain the side chain crystal polymer.

The weight average molecular weights and melting points of the obtained side chain crystal polymers are shown in Table 1. The weight average molecular weight is a polystyrene-converted value of the measured value obtained by GPC. The melting point is a value measured by using DSC under the measurement condition of 10° C./min.

TABLE 1

| | Monomer Component[1] (% by weight) | | | Weight Average Molecular Weight | Melting Point (° C.) |
|---|---|---|---|---|---|
| | C22A | C1A | AA | | |
| Synthetic Example 1 | 45 | 50 | 5 | 560000 | 55 |
| Synthetic Example 2 | 55 | 40 | 5 | 590000 | 60 |

[1])C22A: Behenyl Acrylate, C1A: Methyl Acrylate, AA: Acrylic Acid

Examples 1-6 and Comparative Examples 1-3

<Preparation of Light Shielding Members>

First, the mixture was obtained by mixing in a ratio of 0.5 part by weight of the crosslinking agent to 100 parts by weight of the side chain crystal polymer that was obtained in Synthetic Example 1. The crosslinking agent used is as follows.

Crosslinking agent: "Chemitite PZ-33" manufactured by Nippon Shokubai Co., Ltd., which is an aziridine compound.

Next, the resulting mixture was adjusted by ethyl acetate so as to obtain a solid concentration of 23% by weight, and the coating solution was obtained. The resulting coating solution was then applied to a release film placed on a hot plate heated to 70° C., and the crosslinking reaction was carried out under the condition of 110° C.×3 minutes to obtain a thermosensitive sheet with a thickness of 40 μm as shown in Table 2. The release film used was a polyethylene terephthalate film with a thickness of 50 μm that was coated with silicone on the surface.

Thermosensitive sheets with thicknesses of 80 μm, 160 μm and 320 μm shown in Table 2 were prepared by using the thermosensitive sheet with the thickness of 40 μm obtained above. Specifically, the thermosensitive sheet with the thickness of 80 μm was obtained by adhering two thermosensitive sheets with the thickness of 40 μm obtained above to each other on a hot plate heated to 60° C. The thermosensitive sheet with the thickness of 160 μm was obtained by adhering two thermosensitive sheets with the thickness of 80 μm obtained above to each other on a hot plate heated to 60° C. The thermosensitive sheet with the thickness of 320 μm was obtained by adhering two thermosensitive sheets with the thickness of 160 μm obtained above to each other on a hot plate heated to 60° C.

For Examples 1-6, the thermosensitive sheets were stretched in a uniaxial direction to make uniaxially stretched sheets, thereby the side chain crystal polymers being oriented in one direction. The temperature during the stretching process was set at 70° C., which is higher than the melting point of the side chain crystal polymers. The thickness and stretching magnification after stretching are shown in Table 2.

For Comparative Examples 1-3, the thermosensitive sheets were not stretched in the uniaxial direction.

The thermosensitive sheet was then interposed between the first polarizing plate and the second polarizing plate to obtain a laminated body. At this time, the first polarizing plate and the second polarizing plate were disposed so that their respective transmission axes were different from each other by 90°.

The same polarizing plate was used for the first polarizing plate and the second polarizing plate. The polarizing plate used is as follows.

Polarizing plate: polarizing plate with a thickness of 250 μm manufactured by Artec Co., Ltd.

For Examples 1-6, the thermosensitive sheets were disposed so that the stretching direction of the thermosensitive sheets (the orientation direction of the side chain crystal polymers) was different with respect to the respective transmission axes of the first polarizing plate and the second polarizing plate by 45°.

Next, the resulting laminated body was heated to a temperature of the melting point or higher (70° C.) by using a dryer, and the thermosensitive sheet was sticked to the first polarizing plate and the second polarizing plate. The laminated body was then cooled to room temperature (23° C.), and the first polarizing plate and the second polarizing plate were fixed with the thermosensitive sheet to obtain the light shielding members.

<Evaluation>

Transmittance at a wavelength of 500 nm at a temperature lower than the melting point was measured for the resulting light shielding members. The measurements were performed by using a spectrophotometer. The measurement temperature was set at 23° C., which is lower than the melting point and is the temperature at room temperature. The transmittance at a wavelength of 500 nm at the temperature lower than the melting point (23° C.) was measured for the thermosensitive sheet alone in the same manner as for the light shielding member. The transmittance at a wavelength of 500 nm at 70° C. was also measured. The results are shown in Table 2.

Examples 7-9

<Preparation of Light Shielding Members>

In Examples 7-8, the coating solution was obtained in the same manner as in Examples 1-6, and the resulting coating solution was used to obtain a thermosensitive sheet with the thicknesses shown in Table 2. In Example 9, the coating solution was obtained in the same manner as in Examples 1-6, except that the side chain crystal polymer obtained in Synthesis Example 2 was used, and the resulting coating solution was used to obtain a thermosensitive sheet with the thicknesses shown in Table 2.

The resulting thermosensitive sheet was then stretched in a uniaxial direction to make uniaxially stretched sheets in the same manner as in Examples 1-6, thereby the side chain crystal polymers being oriented in one direction. Then, the light shielding members were obtained in the same manner as in Examples 1-6, except that this thermosensitive sheet was used.

<Evaluation>

The transmittances at a wavelength of 500 nm at a temperature lower than the melting point (23° C.) and at 70° C. were measured for the resulting light shielding members in the same manner as in Examples 1-6. The transmittance at a wavelength of 500 nm at the temperature lower than the melting point (23° C.) was also measured for the thermosensitive sheet alone in the same manner as in Examples 1-6. The results are shown in Table 2.

TABLE 2

| | Side Chain Crystal Polymer | Stretching Process in uniaxial direction | Thickness (μm) Before stretching | Thickness (μm) After stretching | Stretching Magnification (Times) | Thermosensitive Sheet Transmittance at 500 nm (%) | Light Shielding Member Transmittance at 500 nm (%) 23° C. | Light Shielding Member Transmittance at 500 nm (%) 70° C. |
|---|---|---|---|---|---|---|---|---|
| Example 1 | Synthetic Example 1 | Performed | 40 | 31 | 1.29 | 91.9 | 28.5 | 0.1 |
| Example 2 | Synthetic Example 1 | Performed | 40 | 25 | 1.60 | 92.0 | 22.6 | 0.1 |
| Example 3 | Synthetic Example 1 | Performed | 40 | 13 | 3.08 | 92.1 | 8.9 | 0.1 |
| Example 4 | Synthetic Example 1 | Performed | 80 | 64 | 1.25 | 91.8 | 33.6 | 0.1 |
| Example 5 | Synthetic Example 1 | Performed | 160 | 130 | 1.23 | 89.0 | 19.4 | 0.1 |
| Example 6 | Synthetic Example 1 | Performed | 320 | 280 | 1.14 | 85.3 | 11.9 | 0.1 |
| Example 7 | Synthetic Example 1 | Performed | 42 | 40 | 1.05 | 91.7 | 22.2 | 0.1 |
| Example 8 | Synthetic Example 1 | Performed | 79 | 76 | 1.04 | 91.2 | 37.6 | 0.1 |
| Example 9 | Synthetic Example 2 | Performed | 45 | 43 | 1.05 | 90.8 | 27.3 | 0.1 |
| Comparative Example 1 | Synthetic Example 1 | Not Performed | 40 | | — | 91.5 | 0.2 | 0.1 |
| Comparative Example 2 | Synthetic Example 1 | Not Performed | 80 | | — | 90.5 | 0.4 | 0.1 |
| Comparative Example 3 | Synthetic Example 1 | Not Performed | 160 | | — | 88.1 | 0.4 | 0.1 |

It is clear from Table 2 that Examples 1-6 have higher transmittance than Comparative Examples 1-3. Examples 1, 2, 4, and 5, where the thickness of the thermosensitive sheet was 20 to 150 μm, had higher transmittance. Examples 7 to 9 also had higher transmittance than Comparative Examples 1-3.

Light shielding members obtained in Examples 1-9 were evaluated for the light shielding function. Specifically, the light shielding members of Examples 1-9 were first visually observed at room temperature (23° C.), and as a result, the light shielding members were transparent. Next, the light shielding members were heated to a temperature of the melting point or higher (70° C.) by using a dryer and visually observed, and as a result, the light shielding members turned black. The light shielding members were then cooled to room temperature again and visually observed, and as a result, the light shielding members changed to transparent. These results clearly show that Examples 1-9 transmit light at a temperature lower than the melting point and do not transmit light at a temperature of the melting point or higher. It is also apparent that Examples 1-9 repeat the transmission and non-transmission of light.

The light shielding function of the light shielding members obtained in Comparative Examples 1-3 were evaluated in a similar manner to Examples 1-9. As a result, the light shielding members of Comparative Examples 1-3 also transmit light at a temperature lower than the melting point and do not transmit light at a temperature of the melting point or higher, and repeat the transmission and non-transmission of light.

The invention claimed is:

1. A light shielding member comprising:
a first polarizing plate,
a second polarizing plate facing the first polarizing plate, and
a thermosensitive sheet interposed between the first polarizing plate and the second polarizing plate,
wherein:
the first polarizing plate and the second polarizing plate are positioned so that their respective transmission axes are different from each other,
the thermosensitive sheet comprises a side chain crystal polymer that crystallizes at a temperature lower than the melting point and exhibits fluidity at a temperature of the melting point or higher, and
the side chain crystal polymer is oriented in one direction.

2. The light shielding member according to claim 1, wherein light is transmitted at a temperature lower than the melting point and not transmitted at a temperature of the melting point or higher, when light travels from one of the first polarizing plate and the second polarizing plate toward the other.

3. The light shielding member according to claim 1, wherein the thermosensitive sheet is positioned so that an orientation direction of the side chain crystal polymer is different with respect to the respective transmission axes of the first polarizing plate and the second polarizing plate.

4. The light shielding member according to claim 1, wherein a thickness of the thermosensitive sheet ranges from 1 to 300 μm.

5. The light shielding member according to claim 1, wherein the thermosensitive sheet is a uniaxially stretched sheet.

6. The light shielding member according to claim 1, wherein the side chain crystal polymer comprises (meth) acrylate having a straight-chain alkyl group with 16 or more carbon atoms as a monomer component.

* * * * *